March 20, 1945.    A. F. DEES    2,371,956
CONVEYER CONTROL
Filed March 3, 1944
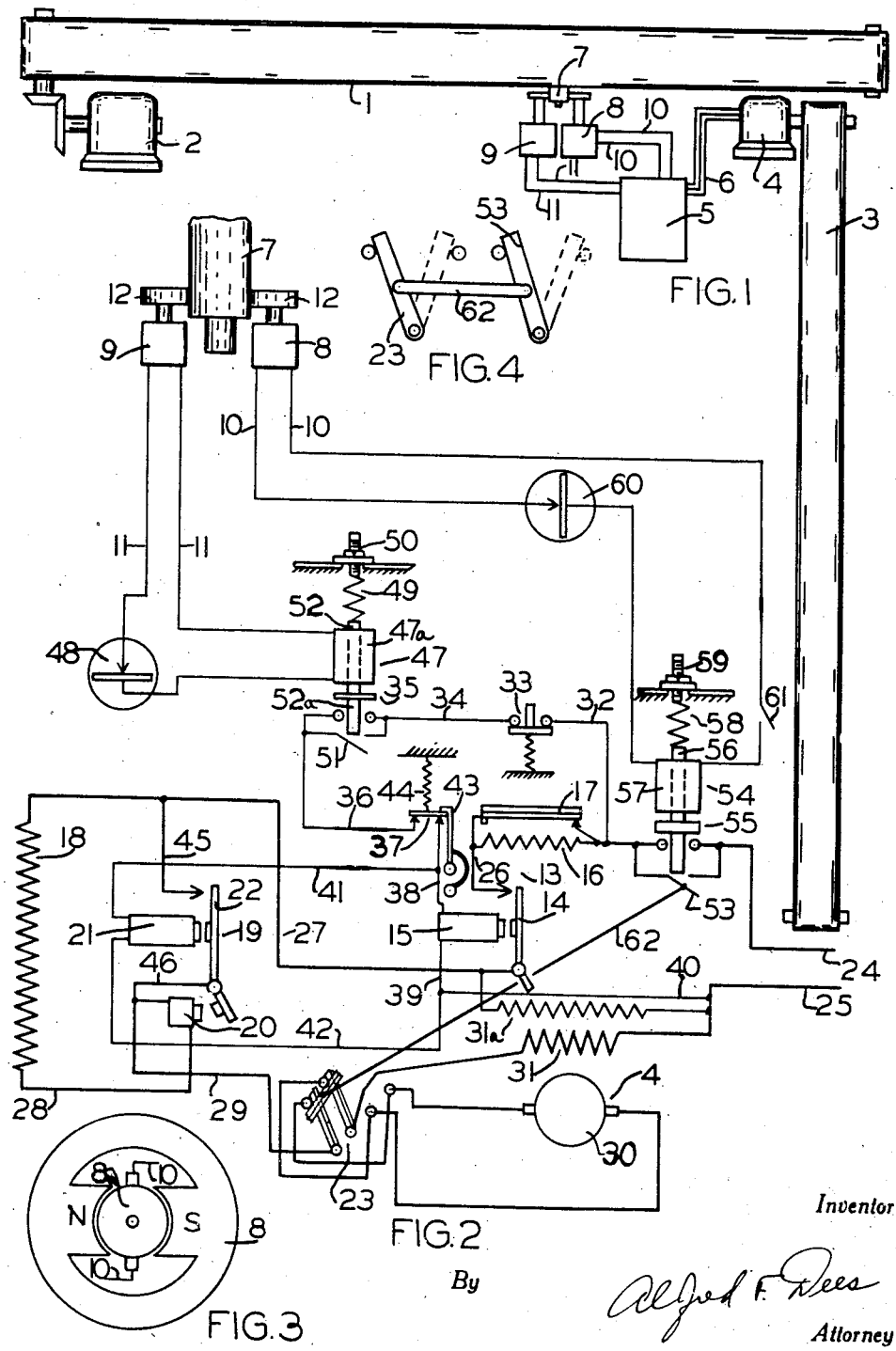
Inventor
Alfred F. Dees
By
Attorney Patented Mar. 20, 1945

2,371,956

UNITED STATES PATENT OFFICE 2,371,956

CONVEYER CONTROL

Alfred F. Dees, Mansfield, Ohio, assignor to The Ohio Brass Company, Mansfield, Ohio, a corporation of New Jersey Application March 3, 1944, Serial No. 524,937

7 Claims. (Cl. 198—82)

This invention relates to conveyers and in its more specified aspects is directed to a control disposed between successive conveyers whereby the movement of one conveyer is controllable by the movement of the other conveyer.

The object of this invention is to provide a control between an ultimate or final conveyer and a preceding conveyer in which the motion of the preceding conveyer is controlled by the movement of the final conveyer.

A further object of the invention is to provide, in a conveyer control, a means extending between succeeding conveyers that will allow a final conveyer to come up to speed before a preceding conveyer starts to operate and in which the preceding conveyer will be stopped whenever the final conveyer is stopped or reversed.

Another object of the invention is to provide a conveyer system, wherein one conveyer discharges onto another conveyer, with a connection or electrical link between them that will prevent forward motion in the preceding conveyer until the succeeding conveyer has come up to a predetermined speed.

Another object of the invention is to provide means in a conveyer system that will prevent starting of the preceding conveyer until after the succeeding one has started and in which the preceding conveyer may be operated reversely without regard to movement in the succeeding conveyer.

A still further object of the invention is to provide a control means in a conveyer system directly engageable with a succeeding conveyer that connects with means in the starter for the motor of the preceding conveyer to control the starting and stopping of the preceding conveyer.

Another and further object of the invention is to provide in a mine conveyer system a means whereby a succeeding conveyer may control and govern the starting and stopping of a preceding conveyer, wherein each conveyer may be individually reversely operated, wherein forward motion of the preceding conveyer is prevented while the succeeding conveyer is reversely operated and further that will allow forward motion in the succeeding conveyer and manually controlled reverse motion in the preceding conveyer.

Another and further object of the invention is to provide an automatic control between successive conveyers in which one of the elements of the control will shift the manual controls in the preceding conveyer to prevent any false operation of the conveyers.

Other and further objects of the invention will occur to those skilled in the arts to which this invention pertains as the description proceeds which taken in connection with the accompanying drawing sets forth a preferred embodiment thereof but such disclosure is not to be construed as a limitation of the invention which is limited only by the appended claims and any and all modifications, alterations and variations of structure coming within the spirit and scope thereof are deemed to be included herein.

In the drawing:

Fig. 1 shows a general plan of a conveyer layout in which one conveyer discharges onto another incorporating the invention.

Fig. 2 shows the wiring diagram of the electrical connection between the two conveyers.

Fig. 3 schematically shows a preferred form of construction of one of the control elements.

Fig. 4 schematically shows a constructional detail of one of the elements of the combination.

Mine conveyers may consist of a main conveyer discharging into mine cars or other appropriate conveyances, and supplying the main conveyers are a plurality of lateral conveyers somewhat shorter in length than the main conveyer. The lateral conveyers are supplied by room conveyers of comparatively short length which may be moved from room to room as conditions dictate.

It is necessary that the main conveyer be stopped from time to time as each mine car or other conveyance is filled and while doing so the lateral and room conveyers should also be stopped in order to avoid choking at the discharge ends of the lateral and room conveyers. Under present practice an operator is responsible for the stopping and starting of the lateral conveyer and the room crew attend to the starting and stopping of the room conveyer. There must be a constant alert by the several operators to avoid disrupting the conveyer service. Some systems have been devised for stopping all motors simultaneously and one of the difficulties is that if the starters of preceding conveyers are not adjusted or opened there will be a simultaneous starting of all conveyers.

This invention provides a device whereby preceding conveyers are not only stopped when the final conveyer has stopped but prevents preceding conveyers from starting until the final conveyer has come up to speed. This prevents initial overloading and allows the final conveyer e. g. to clear itself and come up to speed or to a proper speed before the preceding conveyer is started. The device releases one or more operators for other duties and requires them only when the lateral or room conveyer is to be reversely operated. During forward operation each conveyer provides its own starting means and since each immediately preceding conveyer is dependent upon a proper speed in the succeeding conveyer the likelihood of choking exits or overloading conveyers is materially reduced.

A portion of a conveyer system is illustrated in Fig. 1 which comprises a main conveyer 1 driven by a reversible motor 2 which is provided with a suitable starter (not shown). Discharging onto the conveyer 1 is a transversely disposed or lateral conveyer 3 driven by a reversible motor 4 controlled by starter 5 and connected to the motor 4 by means of conductors 6. One of the rollers in conveyer 1 is shown as distended for convenience sake and is intended to operate control elements 8 and 9 that have conductors 10, 10 and 11, 11 leading to motor starter 5 thereby providing a physical as well as electrical link between conveyers 1 and 3. The control elements 8 and 9 are operated by the roller 7 and are therefore speed responsive and any control obtained is therefore a function of the speed of main conveyer 1.

A portion of the particular conveyer roller 7 is shown in an enlarged form in Fig. 2. Each of the speed responsive elements 8 and 9 is shown as provided with friction driving elements or wheels 12, 12 that engage with the roller 7 and directly drive the elements 8 and 9. These elements may be directly connected to the roller 7 if so desired. The speed responsive elements 8 and 9 are preferably generators of the tachometer type that comprise a permanent magnet frame having the two poles N and S between which armature 8a rotates and leads 10, 10 take off directly from the armature that is equipped with the usual commutator. Any type of current generator is contemplated within the purview of this invention so long as its voltage characteristic somewhat reasonably approximates that of a tachometer type generator. Each of these devices controls a separate relay or solenoid device subsequently described and while two devices 8 and 9 are shown, one device will work with equal facility when two separate controls acting jointly are employed and the use of only one generator 8 or 9 for such joint use is regarded within the purview of this invention.

Motor 4 is controlled by a conventional starter originating in an overload circuit breaker 13 comprising breaker or switch 14 and its holding coil 15, blowout coil 16 and overload thermal element 17. A starting resistance 18 is provided and a timing contactor 19 comprising pivoted element 22 actuated by holding coil 21 which functions or acts against timing or hold-out coil 20. Contactor 19 short-circuits starting resistance 18 after motor 4 current decreases to a certain predetermined value. A reversing switch 23 is provided in the series field-armature circuit to reverse armature rotation. Assuming power coming from lines 24, 25, and both lines unbroken, current will flow through blowout coil 16 and thermal element 17, through conductor 26, the pivoted switch member 14 of circuit breaker 13, conductor 27, starting resistance 18, conductor 28, to and through retarding or hold-out coil 20, conductor 29, through reversing switch 23, the motor armature 30, series field 31 and thence to line 25.

When line 24 is unbroken a circuit for holding coil 15 is established by means of conductor 32, normally closed stop switch 33, conductor 34, the relay contact element 35, conductor 36, switch 37, conductor 38, coil 15, conductor 39 and conductor 40 back to line 25. Coil 21 is in parallel with coil 15 and is connected thereto by means of conductors 41 and 42 and thence across lines 24 and 25. Upon overload coil 16 will pivot holding member 43, thereby releasing bridging element or switch 37 which will break contact with conductors 36 and 38 under the action of spring 44. When the motor current has decreased sufficient to cause coil 20 to be weaker than coil 21, the latter will close contactor 19 and short-circuit the starting resistance by means of conductor 45, pivoted element 22 and conductor 46 to conductor 29. A shunt field 31a is connected across lines 24 and 25 in the usual manner. Much of the foregoing circuit as has been described is conventional structure and is well known in the arts. In a low overload not sufficient for coil 16 to act thermal element 17 will break contact with conductor 24 at the arrow engaging same.

One of the primary objects desired is the necessity of stopping movement in conveyer 3 whenever conveyer 1 is stopped or has its motion reversed. The means for accomplishing this control originates in the generator 9 which, by means of conductors 11, 11 is connected to normally open relay or solenoid 47 which has a bridging element 35 on plunger 52 adapted, when the relay is closed, to bridge conductors 34 and 36. To prevent actuation of relay or solenoid 47 during reverse operation of the conveyer 1 a device 48 similar in character to a copper oxide rectifier is inserted in the circuit of generator 9 and relay 47 such that current will flow in one direction only. A spring 49 serves to retract plunger 52 and adjusting screw 50 is provided to adjust the tension of the said spring. Attention is invited to the fact that solenoid 47 is a very sensitive relay and is responsive to the current produced by the generator 9 at a predetermined voltage. This coil is preferably so proportioned that during operation it will open and release and close at or about 75% of rated voltage of generator 9 or of full speed of conveyer 1. Therefore whenever conveyer 1 slows down more than a predetermined amount the voltage and current of generator 9 will reduce accordingly and relay or solenoid 47 will release thereby stopping motor 4 by opening the circuit to holding coil 15 of starter 5. When coming up to speed it will not close until conveyer 1 reaches a predetermined speed. While 75% of rated voltage of generator 9 is referred to and is indicative of the speed of conveyer 1, this ratio may obviously be adjusted to any desired value. Should conveyer 1 be reversed element 48 will prevent actuation of relay or solenoid 47.

Should it be desired at any time to reverse conveyer 3, when conveyer 1 is at rest or running reversely a shunting switch 51 is closed that shunts the contacts for relay element 35. When therefore, switch 53 or one similar to it is closed and switch 23 shifted conveyer 3 may be reversely operated. Reverse operation of conveyer 3 may be performed while conveyer 1 is running forwardly with relay 47 closed and switch 23 shifted as previously indicated. This is an entirely manual operation and the operator is responsible for the opening and closing of the switches. In another mode of operation and construction, subsequently described, means have been provided to insure joint operation of switches 23 and 53 but for the instant purposes it is assumed that 53 and 23 are independently operable. To prevent permanently closing coil 15 circuit the plunger 52 and switch 51 are set in line such that plunger tip 52a will open switch 51 whenever 47 is energized. This will insure that coil 15 circuit will be open whenever conveyer 1 is slowed down too much, is stopped during forward operation of conveyer 1 or is reversed. An operator, after reversely running conveyer 3, may forget to open switch 51 but should this happen, as soon as coil 47a is energized plunger tip 52a will open the switch 51.

When the device is operated with relay 47 alone it functions as a means of preventing motion in conveyer 3 in conjunction with current flow control element 48 when conveyer 1 is reversed. Switch 51 as previously indicated would then be closable and openable without regard to any other portion of the mechanism. The mechanism thus far described is a completely operative device and can operate to fully protect conveyer 1 and prevent any operation in conveyer 3 when conveyer 1 is stopped, reversed or runs too slowly.

The overload, reverse motion and stop control can also be accomplished by a relay or solenoid device 54 provided in the power line 24. It is assumed for present purposes that it is the sole control for the conveyer system. This relay has a bridging element 55 secured to a plunger 56 operating within relay coil 57. The relay is normally open and is retained in that position by means of a spring 58 whose tension is adjusted by screw 59. Coil 57 is connected to generator 8 by conductors 10, 10 in which a reverse current flow device 60, similar to device 48, is inserted and a manual switch 61 is included although, if desired, a switch similar to 33 may be employed.

Relay 54 is also a sensitive device and is assumed to have characteristics similar to or the same as relay 47 described above. It is intended to close or open at about 75% rated current and voltage of generator 8, therefore, rated speed of conveyer 1.

A switch 53 is intended to connect the fixed contacts of relay 54 during manual operation. To insure that the controller or starter 5 is set for reverse operation when switch 53 is closed a mechanical linkage 62 is connected between switches 23 and 53. The connection is schematically shown in Fig. 2 but a suggested construction is shown in Fig. 4. This connection insures that whenever either of switches 53 or 23 is manually shifted the other will operate in unison therewith.

The linkage 62 also prevents any reverse operation of the motor 4 when relay 54 is actuated by forward movement of conveyer 1. Plunger 56 is provided with an extension or tip engageable with switch 53 such that when relay 54 is actuated it will open switch 53 and shift switch 23 to the position shown, it being assumed that motor 4 will operate forwardly when set in the said position shown. This action will occur prior to the time the contacts on relay 54 close.

When, therefore, conveyer 1 has come up to speed relay 54 will actuate closing the circuit to the circuit breaker 13 and allowing it and contactor 19 to function in the usual manner.

The reverse operation of conveyer 3 is accomplished when conveyer 1 is at rest or reversely operated by merely closing switch 53 which simultaneously shifts reversing switch 23. If conveyor 1 is operating forwardly, then switch 61 is opened to de-energize coil 57 and closure of switch 53 and joint shifting of switch 23 will cause the necessary reverse operation. After the operator closes switch 61 and should he fail to open switch 53 and simultaneously shift switch 23, the relay 54 will perform the necessary opening and shifting of the respective switches 53 and 23, setting them for forward operation of conveyer 3.

The invention thus far is considered as operating with each of the relays 47 and 54 functioning alone and without the presence of the other. Another mode of operation requiring the use of both relays involves altering the operating characteristics of one of them. Relay 54 would retain the same characteristics as set forth above and since it is now desired to delay starting conveyer 3 until conveyer 1 has attained a speed of about 90% rated speed, relay 47 will be one of a different characteristic. It is preferred that relay 47 now be of sluggish type, usually achieved by increasing the core size relative to the winding and adjusting it such that it will not close until conveyer 1 is up to about 90% speed. The generator relay circuit would otherwise remain the same.

Since relay 57 will close at about 75% rated speed of conveyer 1 it is thus seen that switch 53 will be opened and reversing switch 23 shifted to forward position in the event that an operator fails to shift them after reversely operating conveyer 3. Therefore it will not be possible for conveyer 3 to be operated reversely under the influence of conveyer 1 because of the action of relay 54. Should it be desired to operate conveyer 3 reversely during forward operation of conveyer 1, switch 61 is opened thereby preventing operation of relay 54. When conveyer 1 has come up to 90% speed relay 47 will close, and because it is sluggish in character, relay 54 will function as the overload control. The use of the two relays affords a measure of flexibility not achieved by either one of the relays taken alone by causing the conveyer 3 to start only when conveyer 1 is at or about 90% of rated speed but conveyer 3 will not be stopped until conveyer 1 has dropped to about 75% rated speed.

It should be apparent from the above that an effective control is provided between two successive conveyers in which the motion of one is controlled by the motion or direction of motion in the other. It is further apparent that an effective control can be achieved with relays 47 or 54 taken alone or in combination by a mere altering of the operating characteristics of one of them. When operating alone both are sensitive and when operating together one is sluggish and one is sensitive. The controls singly or in combination may be placed between succeeding conveyers whether arranged in line or transverse to each other.

It is also within the purview of this invention to interpose relays between generators 8 and 9 and relays 47 and 54 in the several circuits in order to employ higher powered relays in the event conditions demand same.

That which is regarded new, novel and useful and which is sought to be protected by Letters Patent of the United States is as follows.

I claim:

1. The combination of a first conveyer and means to operate the same in forward and reverse directions, a second conveyer arranged to feed the first conveyer and means to operate the same in forward and reverse directions, means to control the operation of the operating means for the second conveyer, a coil operated relay to control the energization of the operating means for the second conveyer or whereby the movement of the second controller is brought to rest when movement of the first conveyer stops or is reduced below a predetermined speed or is brought into reverse, and means operated by the first conveyer to effect energization of said relay coil and a second coil operated relay to control the energization of the operating means for the second conveyer whereby the reverse movement of the second conveyer is automatically prevented when the movement of the first conveyer is forward, and the means operated by the first conveyer to effect energization of the coil of the said second relay.

2. The combination of a reversibly operable first conveyer unit including a conveyer and drive means, a reversibly operable second conveyer unit including a conveyer and a motor to drive the same, means to control the stopping and the starting and the reverse movement of the motor for the second unit, a pair of independent current generators associated with the first said unit and operated thereby, a solenoid switch controlled by and energized wholly by the current of one of the generators to control the operation of the said control means whereby the control means is rendered inoperative when the forward movement of the first conveyor unit is stopped or the speed reduced below a predetermined amount, a second solenoid switch controlled by and energized wholly by the current of the other generator to control the operation of the said control means whereby the reverse movement of the second conveyer is prevented when the movement of the first conveyer is forward, the second solenoid switch arranged to close at a slower speed of the first conveyer unit than the first solenoid switch whereby the reverse movement of the second conveyer unit is prevented when the first conveyer unit is operated forwardly.

3. In a conveyer control system comprising a reversibly operable main conveyer and a second conveyer discharging onto said main conveyer and a motor to operate said second conveyer and a normally open power circuit to supply current to said motor and including a reversing switch and manually operable means to close the power circuit to operate said second motor reversely; the combination with said manual switch of means whereby said reversing switch is set for the reverse operation of said motor when said manual switch is closed; a coil controlled relay with contacts in parallel with those of said manual switch and closable after said main conveyer reaches a predetermined speed in a forward direction to automatically close the power circuit; said relay having means thereon engageable with said manual switch to open same thereby simultaneously shifting said reversing switch to its forward position upon actuation of said relay; a generator driven by said main conveyer to energize said relay; and means to prevent the current from said generator operating said relay while said main conveyer is reversely operating.

4. In a conveyer system; a reversibly driven first conveyer unit; a reversibly driven second conveyer; a motor to drive same, the motor connected to a source of power and a reversing switch included in said connection; means to govern the starting of said second motor from said first conveyer unit which includes a generator driven by said first conveyer unit; a current controlled relay in the connection, the actuation of which is controlled only by the current derived from said generator to start said second motor when said first conveyer has attained a predetermined speed; means to prevent the flow of current to said relay during reverse operation of said first conveyer; manually operable means in parallel relation to said relay to enable the conveyers to be reversely operated independently of each other; means associated with the manually operable means and said reversing switch whereby said reversing switch will be shifted simultaneously with the closing of said manually operable means, the said relay arranged to automatically effect the opening of said manually operable means prior to the relay closing whereby the shifting of said reversing switch to its forward position is effected prior to the energization of the motor for the second conveyer.

5. A conveyer system comprising in combination, a first conveyer unit and a reversible motor to drive the same, a second conveyer unit and a reversible motor to drive same, an electric generator associated with and operated by said first conveyer unit, an electric control for the motor of the second conveyer and receiving current from a main source of supply, switch means associated with said electric control and responsive to the current of said generator to close the switch and start said second conveyer forward when said first conveyer reaches a predetermined speed means to prevent the flow of current to said switch whereby the forward operation of said second conveyer is prevented when the first conveyer is reversely operated, reversing means associated with said electric control to operate said second conveyer reversely without regard to movement in said first conveyer and means associated with the said switch cooperating with said reversing means to prevent reverse operation of the second conveyer while the first conveyer is operating forwardly.

6. In a conveyer system, a first conveyer reversibly operable, a second conveyer discharging onto the first conveyer and a motor to drive the same, a power circuit to supply current to operate the motor including a reversing switch, a control device associated with said first conveyer and operable thereby, a normally open relay to close the power circuit to said motor when the first conveyer moves forward, said control device so governing the operation of said relay as to stop the second conveyer when the first conveyer is slowed down or at rest, means to prevent forward operation of the second conveyer when the first conveyer is reversely operated, manually operable switch means to close the power circuit to operate the second conveyer independent of the first conveyer, means linking the manual switch and the reversing switch for simultaneous operation whereby the second conveyer will always operate reversely when the manual switch is closed, and said relay having means thereon engageable with said manual switch to open same and shift said reversing switch when said relay is actuated by said first conveyer such that both the conveyers will operate forwardly.

7. The combination of a reversible main conveyer, a second conveyer discharging onto the main conveyer, a reversible motor to drive the second conveyer either forward or in reverse, an electric controller for the said motor which includes a normally open power circuit, a pair of coil operated relays arranged to close the power circuit in sequence, generator means operable by the main conveyer to supply current proportioned to the speed of the main conveyer to said coils to effect the closing operation of the relays and the power circuit, the relays operable to their closed condition at predetermined starting speeds of the main conveyer, one relay operable to complete the closure of the power circuit at a higher predetermined speed of the main conveyer than the other relays, and means associated with the relays whereby the said other relay will open the power circuit when the speed of the main conveyer has dropped to a predetermined speed which is lower than the predetermined speed of the main conveyer at which the said one relay operated to complete the closure of the power circuit.

ALFRED F. DEES.